United States Patent
Lee et al.

(10) Patent No.: US 11,747,869 B2
(45) Date of Patent: Sep. 5, 2023

(54) DISPLAY DEVICE

(71) Applicant: Samsung Display Co., Ltd., Yongin-Si (KR)

(72) Inventors: Hyun Jae Lee, Yongin-si (KR); Sung Hwan Kim, Yongin-si (KR); Young Seok Yoo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/863,641

(22) Filed: Jul. 13, 2022

(65) Prior Publication Data

US 2023/0176630 A1    Jun. 8, 2023

(30) Foreign Application Priority Data

Dec. 3, 2021   (KR) .................. 10-2021-0172219

(51) Int. Cl.
*G06F 3/041* (2006.01)
*G06F 1/16* (2006.01)
*H01Q 1/22* (2006.01)

(52) U.S. Cl.
CPC .......... *G06F 1/1698* (2013.01); *G06F 1/1652* (2013.01); *G06F 3/04164* (2019.05); *H01Q 1/2266* (2013.01); *G06F 2203/04102* (2013.01)

(58) Field of Classification Search
CPC .... G06F 1/1652; G06F 3/041; G06F 3/04164; G06F 2203/04102
See application file for complete search history.

(56) References Cited

U.S. PATENT DOCUMENTS

| | | | |
|---|---|---|---|
| 9,753,501 | B2 | 9/2017 | Heo et al. |
| 10,409,433 | B2* | 9/2019 | Kwak .................... G06F 3/0412 |
| 10,802,629 | B2 | 10/2020 | Jeon et al. |
| 10,990,234 | B2 | 4/2021 | Kim et al. |
| 2019/0353540 | A1* | 11/2019 | Hong .................... G06F 1/1652 |
| 2020/0057507 | A1* | 2/2020 | Park .................... G06F 3/04142 |
| 2020/0201470 | A1* | 6/2020 | Oh ........................ G06F 3/0412 |
| 2021/0135337 | A1* | 5/2021 | Kim ..................... G06F 1/1698 |
| 2021/0263606 | A1* | 8/2021 | Lee ........................ H01Q 1/243 |

(Continued)

FOREIGN PATENT DOCUMENTS

| KR | 20110057385 A | * | 6/2011 |
|---|---|---|---|
| KR | 10-2009382 B1 | | 8/2019 |

(Continued)

*Primary Examiner* — Joe H Cheng
(74) *Attorney, Agent, or Firm* — Innovation Counsel LLP

(57) ABSTRACT

A display device is disclosed that includes a display panel, a sensor substrate, sensing electrodes, an antenna pattern, an antenna signal line, an antenna pad, and an antenna frame. The sensor substrate is disposed on an upper surface of the display panel and includes a touch sensing area, a first peripheral area adjacent to the touch sensing area, and a second peripheral area bent from the first peripheral area. The sensing electrodes and the antenna pattern are disposed on the touch sensing area of the sensor substrate. The antenna signal line is connected from the antenna pattern and extends to the first peripheral area and the second peripheral area. The antenna pad is disposed in the second peripheral area and connects to the antenna signal line. The antenna frame is attached to a lower surface of the display panel and defines a bending shape of the sensor substrate.

20 Claims, 9 Drawing Sheets

(56) References Cited

U.S. PATENT DOCUMENTS

2021/0318730 A1* 10/2021 Lee .................... H01Q 1/22
2022/0137741 A1* 5/2022 Choi .................. G06F 3/0412
　　　　　　　　　　　　　　　　　　　345/156

FOREIGN PATENT DOCUMENTS

| KR | 10-2019-0107235 A | | 9/2019 |
|---|---|---|---|
| KR | 10-2180953 B1 | | 11/2020 |
| KR | 10-2214485 B1 | | 2/2021 |
| KR | 10-2021-0053374 A | | 5/2021 |
| KR | 20210084838 A | * | 7/2021 |

* cited by examiner

DISPLAY DEVICE

CROSS-REFERENCE TO RELATED APPLICATION

The application claims priority to and the benefit of Korean Patent Application No. 10-2021-0172219, filed Dec. 3, 2021, which is hereby incorporated by reference for all purposes as if fully set forth herein.

BACKGROUND

Field

The present disclosure relates to a display device.

Discussion

Some display devices have a function of inputting information as well as a function of displaying an image. In such display devices, the function of inputting information may be generally implemented as a touch sensor for receiving a user's touch input.

The touch sensor may be attached to one surface of a display panel that implements the function of displaying an image, or may be formed integrally with the display panel. A user may input information by pressing or touching the touch sensor while watching an image implemented on the display panel.

Meanwhile, an electronic device such as a terminal including a display device includes an antenna for short-distance or long-distance wireless communication.

SUMMARY

Embodiments of the present disclosure may provide a display device including a sensor substrate disposed on a display panel to be bent, and an antenna frame that guides and supports the bending of the sensor substrate and extends a ground plane of a device.

A display device according to an embodiment may include a display panel; a sensor substrate disposed on an upper surface of the display panel and including a touch sensing area, a first peripheral area adjacent to the touch sensing area, and a second peripheral area bent from the first peripheral area; sensing electrodes and an antenna pattern disposed on the touch sensing area of the sensor substrate; an antenna signal line connected from the antenna pattern and extending to the first peripheral area and the second peripheral area; an antenna pad disposed in the second peripheral area and connected to the antenna signal line; and an antenna frame attached to a lower surface of the display panel and defining a bending shape of the sensor substrate.

In an embodiment, the antenna frame may be connected to a ground of the display panel.

In an embodiment, the antenna frame may include a body portion supporting the second peripheral area of the sensor substrate; and a bending guide portion extending from the body portion to a side surface of the display panel and positioned between the side surface of the display panel and the sensor substrate, and defining a bending position of the sensor substrate.

In an embodiment, the body portion and the bending guide portion may include a conductive material.

In an embodiment, the body portion may include an empty space.

In an embodiment, the body portion may include a first body portion and a second body portion having different dielectric constants.

In an embodiment, at least a portion of the second body portion may be surrounded by the first body portion.

In an embodiment, the side surface of the display panel may include a groove, and the bending guide portion may include a protrusion coupled to the groove.

In an embodiment, the display panel may include a bending portion corresponding to a shape of the antenna frame.

In an embodiment, a plurality of surfaces of the antenna frame may be attached to the bending portion of the lower surface of the display panel by an adhesive.

In an embodiment, the adhesive may include a conductive adhesive.

In an embodiment, the sensing electrodes and the antenna pattern may be disposed on the same insulating layer and spaced apart from each other.

In an embodiment, the display device may further include a dummy electrode disposed on the touch sensing area of the sensor substrate and spaced apart from the sensing electrodes and the antenna pattern.

In an embodiment, the display device may further include a touch ground line disposed to surround the touch sensing area in the first peripheral area of the sensor substrate.

A display device according to an embodiment may include a display panel; a sensor substrate disposed on an upper surface of the display panel and including a touch sensing area, a first peripheral area adjacent to the touch sensing area, a second peripheral area bent from the first peripheral area, and a third peripheral area bent from the second peripheral area; sensing electrodes and an antenna pattern disposed on the touch sensing area of the sensor substrate; an antenna signal line connected to the antenna pattern and extending to the first peripheral area, the second peripheral area, and the third peripheral area; an antenna pad disposed in the third peripheral area and connected to the antenna signal line; and an antenna frame attached to a lower surface of the display panel and defining a bending shape of the sensor substrate. The antenna frame may be connected to a ground of the display panel or an external ground.

In an embodiment, the antenna frame may include a body portion supporting the second peripheral area and the third peripheral area of the sensor substrate; and a bending guide portion extending from the body portion to a side surface of the display panel and positioned between the side surface of the display panel and the sensor substrate, and defining a bending position of the sensor substrate.

In an embodiment, the third peripheral area may face the first peripheral area.

In an embodiment, the antenna pad may overlap the display panel in a vertical direction of the display panel.

In an embodiment, the side surface of the display panel may include a groove, and the bending guide portion may include a protrusion coupled to the groove.

In an embodiment, the antenna pad may include an antenna signal pad transmitting an AC signal to the antenna pattern through the antenna signal line; and a ground pad connected to the ground.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts.

DETAILED DESCRIPTION

Hereinafter, embodiments of the present disclosure will be described in more detail with reference to the accompanying drawings. The same reference numerals are used for the same elements in the drawings, and duplicate descriptions for the same elements are omitted.

The accompanying drawings in the present specification are for easily explaining the present disclosure. Since the shapes shown in the drawings may be exaggerated as necessary to help the understanding of the present disclosure, the present disclosure is not limited by the drawings.

In the present specification, when it is determined that a detailed description of a known configuration or function related to the present disclosure may obscure the gist of the present disclosure, a detailed description thereof will be omitted if necessary.

As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

Figure 1:
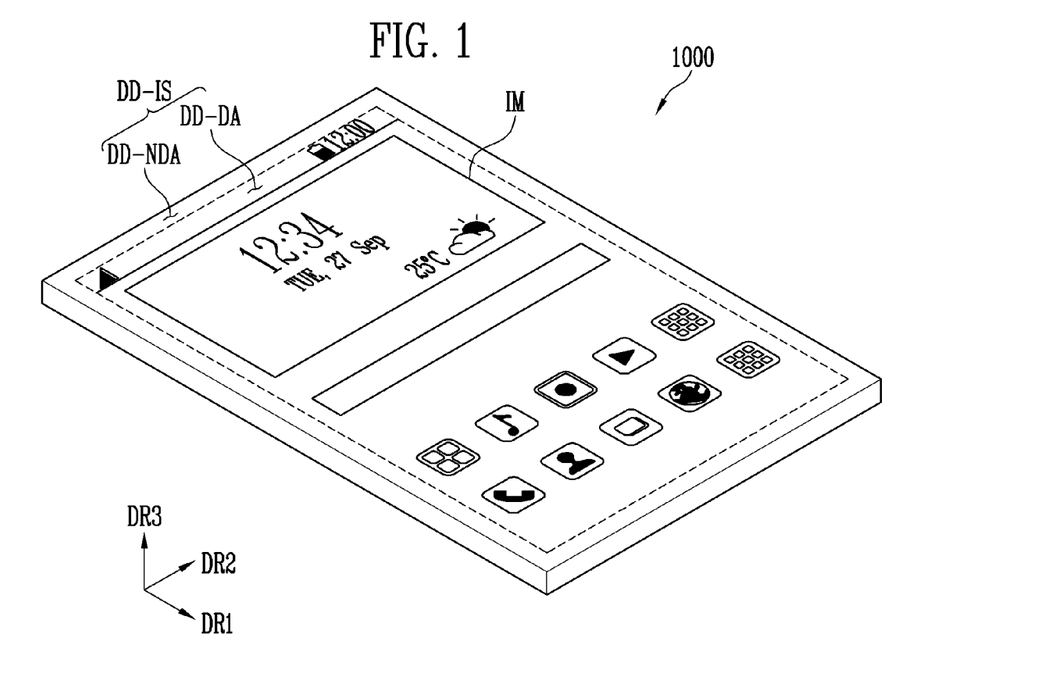
FIG. 1 is a perspective view illustrating a display device according to embodiments of the present disclosure.

FIG. 1 is a perspective view illustrating a display device according to embodiments of the present disclosure.

Referring to FIG. 1, a display device 1000 may display an image IM through a display surface DD-IS. The display surface DD-IS may be parallel to a surface defined by a first direction DR1 and a second direction DR2. A third direction DR3 may indicate a normal direction of the display surface DD-IS, that is, a thickness direction of a display device DD.

A front surface (or an upper surface) and a rear surface (or a lower surface) of each of members, layers, or units described below may be divided by the third direction DR3. However, the first to third directions DR1, DR2, and DR3 are merely examples, and directions indicated by the first to third directions DR1, DR2, and DR3 are relative concepts and may be converted into other directions.

The display device DD may have a flat display surface. The present disclosure is not limited thereto, and the display device DD according to an embodiment of the present disclosure may include various types of display surfaces capable of displaying an image, such as a curved display surface or a three-dimensional display surface.

In an embodiment, the display device DD may be a flexible display device. For example, the display device DD may be applied to a foldable display device, a bendable display device, a rollable display device, or the like.

In FIG. 1, the display device DD applicable to a mobile terminal is shown as an example. However, this is only an example, and the display device DD may be applied to large electronic devices such as televisions, monitors, and electric billboards, as well as small and medium-sized electronic devices such as tablets, navigation devices, game consoles, and smart watches. Also, the display device DD may be applied to a wearable electronic device such as a head-mounted display.

As shown in FIG. 1, the display surface DD-IS of the display device DD may include a display area DD-DA on which an image IM is displayed and a non-display area DD-NDA adjacent to the display area DD-DA. The non-display area DD-NDA may be an area in which the image IM is not displayed.

Figure 2:
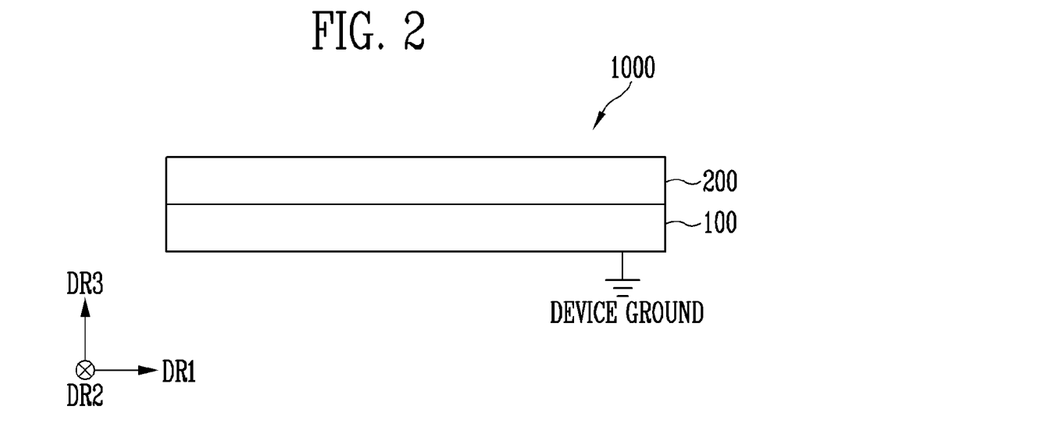
FIG. 2 is a cross-sectional view schematically illustrating the display device according to embodiments of the present disclosure.

FIG. 2 is a cross-sectional view schematically illustrating the display device according to embodiments of the present disclosure.

Referring to FIGS. 1 and 2, the display device 1000 may include a display panel 100 and a touch sensor 200.

The display panel 100 may include a display element layer including a light emitting element, transistors for driving the light emitting element, and wirings, and an encapsulation layer for encapsulating the display element layer. The display element layer may include display elements constituting a pixel. In an embodiment, the display panel 100 may include a device ground for stabilizing driving or may be connected to an external device ground.

The touch sensor 200 may sense a touch or input by an external medium such as a finger or a pen on the display surface DD-IS of the display device DD. The touch sensor 200 may be provided on the display panel 100. In an embodiment, the touch sensor 200 may include sensing electrodes used to sense a touch and an antenna member used to wireless communicate with outside.

In an embodiment, the display panel 100 and the touch sensor 200 may be formed by successive processes. For example, the touch sensor 200 may be directly disposed on the encapsulation layer of the display panel 100.

In an embodiment, the touch sensor 200 may be formed by a process separate from a process of forming the display panel 100, and may be attached to the display panel 100. For example, the touch sensor 200 may be provided in the form of a touch panel and may be attached to an upper surface of the display panel 100 by an optically transparent adhesive member or the like.

Figure 3:
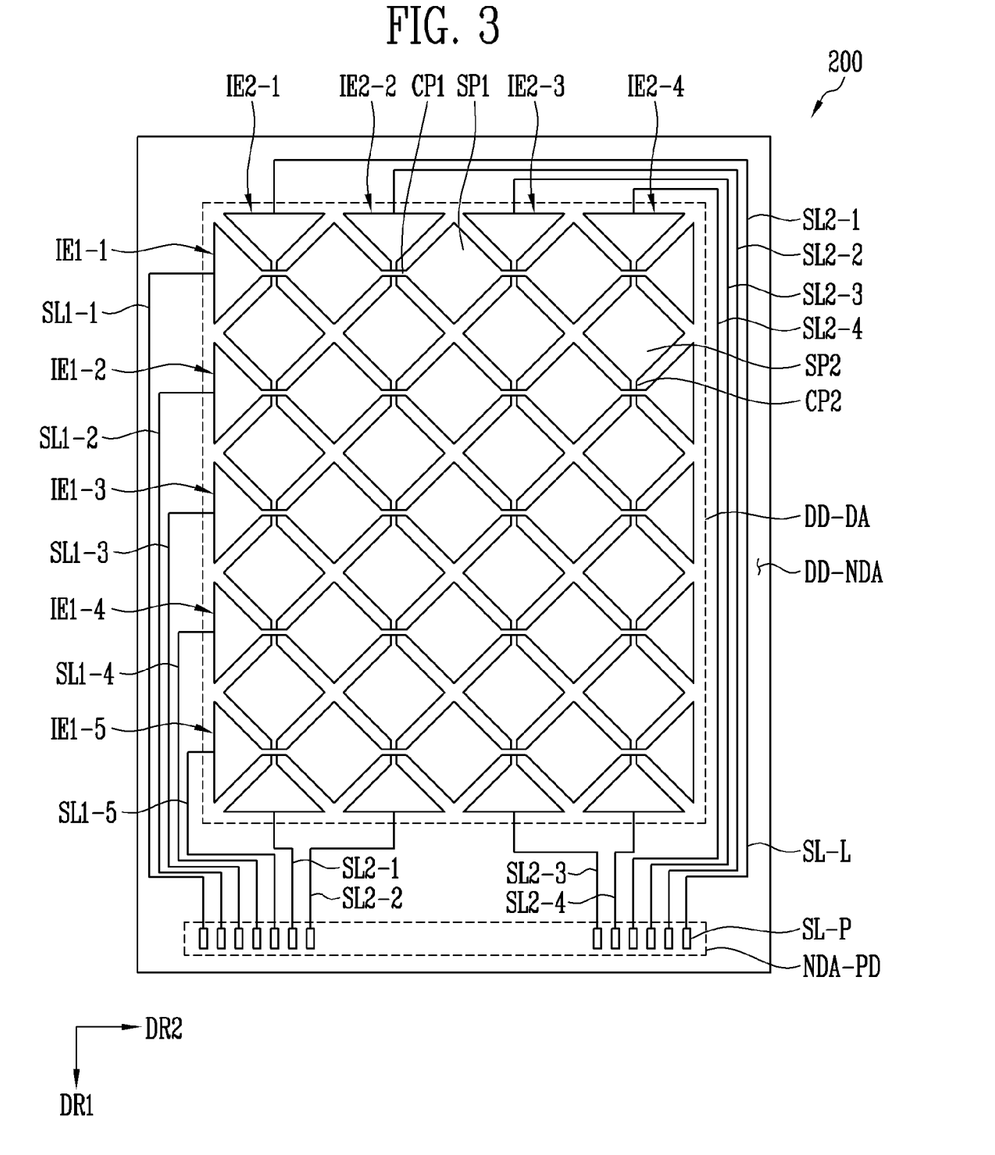
FIG. 3 is a plan view illustrating an example of a touch sensor included in the display device of FIG. 2.

FIG. 3 is a plan view illustrating an example of a touch sensor included in the display device of FIG. 2.

Referring to FIGS. 1, 2, and 3, the touch sensor 200 may include first sensing electrodes IE1-1 to IE1-5, first signal lines SL1-1 to SL1-5 connected to the first sensing electrodes IE1-1 to IE1-5, second sensing electrodes IE2-1 to IE2-4, and second signal lines SL2-1 to SL2-4 connected to the second sensing electrodes IE2-1 to IE2-4.

The first sensing electrodes IE1-1 to IE1-5 and the second sensing electrodes IE2-1 to IE2-4 may be disposed in a touch sensing area corresponding to the display area DD-DA.

The first sensing electrodes IE1-1 to IE1-5 and the second sensing electrodes IE2-1 to IE2-4 may cross each other. The first sensing electrodes IE1-1 to IE1-5 may be arranged substantially parallel to the first direction DR1, and each of the first sensing electrodes IE1-1 to IE1-5 may have a shape extending parallel to the second direction DR2. The second sensing electrodes IE2-1 to IE2-4 may be arranged substantially parallel to the second direction DR2, and each of the second sensing electrodes IE2-1 to IE2-4 may have a shape extending parallel to the first direction DR1. The touch sensor 200 may sense an external input using a mutual capacitance method or a self-capacitance method.

Each of the first sensing electrodes IE1-1 to IE1-5 may include a first sensor portion SP1 and a first connection portion CP1. Each of the second sensing electrodes IE2-1 to IE2-4 may include a second sensor portion SP2 and a second connection portion CP2.

In an embodiment, the first sensing electrodes IE1-1 to IE1-5 and the second sensing electrodes IE2-1 to IE2-4 may have a shape in which a sensor portion and a connection portion are not distinguished (for example, a bar shape). Although first sensor portions SP1 and second sensor portions SP2 having a rhombus shape are shown as an example, the present disclosure is not limited thereto. The first sensor portions SP1 and the second sensor portions SP2 may be implemented in various shapes.

Also, in an embodiment, the first sensing electrodes IE1-1 to IE1-5 and the second sensing electrodes IE2-1 to IE2-4 may be formed in a mesh pattern.

In one first sensing electrode, the first sensor portions SP1 may be arranged along the second direction DR2. In one second sensing electrode, the second sensor portions SP2 may be arranged along the first direction DR1. Each first connection portion CP1 may connect adjacent first sensor portions SP1, and each second connection portion CP2 may connect adjacent second sensor portions SP2.

In an embodiment, the first connection portion CP1, the first sensor portion SP1, and the second sensor portion SP2 may be disposed on the same layer, and the second connection portion CP2 may be disposed on a different layer from the first connection portion CP1, the first sensor portion SP1, and the second sensor portion SP2. Accordingly, the first sensing electrodes IE1-1 to IE1-5 and the second sensing electrodes IE2-1 to IE2-4 may not be short-circuited to each other.

The first signal lines SL1-1 to SL1-5 may be connected to one end of each of the first sensing electrodes IE1-1 to IE1-5. The second signal lines SL2-1 to SL2-4 may be connected to both ends of the second sensing electrodes IE2-1 to IE2-4. The first signal lines SL1-1 to SL1-5 and the second signal lines SL2-1 to SL2-4 may extend in the non-display area DD-NDA.

In an embodiment, the first signal lines SL1-1 to SL1-5 may be connected to only one end of each of the first sensing electrodes IE1-1 to IE1-5. In an embodiment, the second signal lines SL2-1 to SL2-4 may be connected to both ends of the second sensing electrodes IE2-1 to IE2-4.

The first signal lines SL1-1 to SL1-5 and the second signal lines SL2-1 to SL2-4 may include a wiring portion SL-L and a pad portion SL-P. The pad portion SL-P may be connected to pads aligned in a pad area NDA-PD.

However, this is only an example, and the shape of the touch sensor 200 on a plane is not limited thereto.

In an embodiment, the touch sensor 200 may further include a dummy electrode (or an optical dummy electrode) disposed to be spaced apart from the first sensing electrodes IE1-1 to IE1-5 and the second sensing electrodes IE2-1 to IE2-4.

In addition, the touch sensor 200 may further include an antenna pattern (for example, shown in FIG. 1) disposed to be spaced apart from the first sensing electrodes IE1-1 to IE1-5 and the second sensing electrodes IE2-1 to IE2-4. The antenna pattern may be disposed in the display area DA-DD.

An antenna signal line connected to the antenna pattern may extend to the non-display area DD-NDA. One end of the antenna signal line may be connected to an antenna pad disposed in the non-display area DD-NDA.

Figure 4:
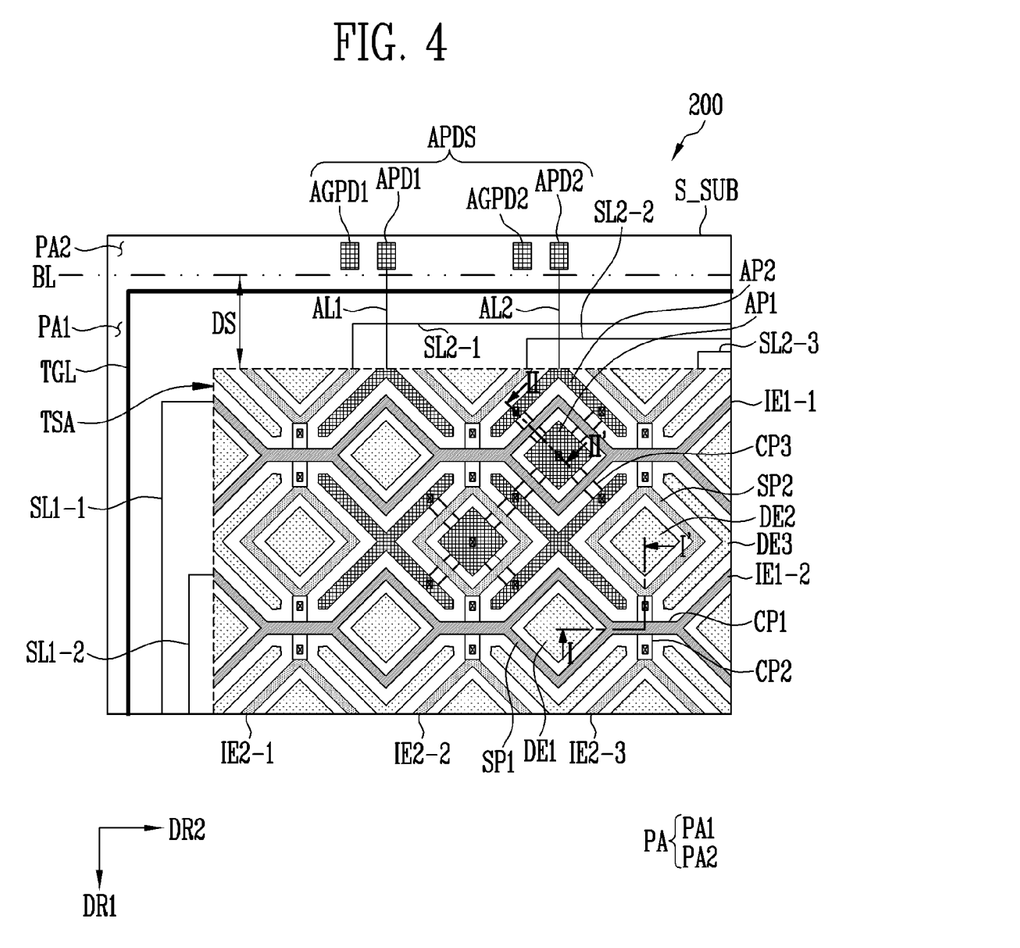
FIG. 4 is a diagram illustrating an example in which a part of the touch sensor of FIG. 3 is enlarged.

FIG. 4 is a diagram illustrating an example in which a part of the touch sensor of FIG. 3 is enlarged.

Referring to FIG. 4, the touch sensor 200 may include first sensing electrodes IE1-1 and IE1-2, first signal lines SL1-1 and SL1-2, second sensing electrodes IE2-1, IE2-2, and IE2-3, second signal lines SL2-1, SL2-2, and SL2-3, dummy electrodes DE1, DE2, and DE3, antenna patterns AP1 and AP2, antenna signal lines AL1 and AL2, and antenna pads APDS.

The first sensing electrodes IE1-1 and IE1-2, the first signal lines SL1-1 and SL1-2, the second sensing electrodes IE2-1, IE2-2, and IE2-3, the second signal lines SL2-1, SL2-2, and SL2-3, the dummy electrodes DE1, DE2, and DE3, the antenna patterns AP1 and AP2, the antenna signal lines AL1 and AL2, and the antenna pads APDS may be disposed on a sensor substrate S_SUB.

The sensor substrate S_SUB (or touch sensor substrate) may include a touch sensing area TSA and a peripheral area PA. The touch sensing area TSA may overlap the display area (e.g., DD-DA of FIG. 3).

The peripheral area PA may include a first peripheral area PA1 adjacent to the touch sensing area TSA and a second peripheral area PA2 bent from the first peripheral area PA1. The second peripheral area PA2 may be bent from the first peripheral area PA1 based on a bending line BL.

The first sensing electrodes IE1-1 and IE1-2, the dummy electrodes DE1, DE2, and DE3, and the antenna patterns AP1 and AP2 may be disposed in the touch sensing area TSA.

Each of the first sensing electrodes IE1-1 and IE1-2 may include a first sensor portion SP1 and a first connection portion CP1. Each of the second sensing electrodes IE2-1, IE2-2, and IE2-3 may include a second sensor portion SP2 and a second connection portion CP2. In an embodiment, the first sensor portion SP1 and the second sensor portion SP2 may include openings, respectively. For example, the shape of the first sensor portion SP1 and the second sensor portion SP2 on a plane may be a rhombus shape with a hole in the center.

A dummy electrode or an antenna pattern may be disposed in the openings of the first sensor portion SP1 and the second sensor portion SP2.

A first dummy electrode DE1 may be disposed to be spaced apart from the first sensor portion SP1 within the opening of the first sensor portion SP1. A second dummy electrode DE2 may be disposed to be spaced apart from the second sensor portion SP2 within the opening of the second sensor portion SP2. For example, the first dummy electrode DE1 and the second dummy electrode DE2 may have a rhombus shape.

A third dummy electrode DE3 may be disposed in a space between the first sensing electrodes IE1-1 and IE1-2 and the second sensing electrodes IE2-1, IE2-2, and IE2-3.

Each of the first to third dummy electrodes DE1 to DE3 may be formed in an island shape and may be a floating electrode. According to an embodiment, at least some of the first to third dummy electrodes DE1 to DE3 may be omitted.

The antenna patterns AP1 and AP2 and the antenna signal lines AL1 and AL2 may be used for wireless communication with outside of the display device. For example, an antenna element including the antenna patterns AP1 and AP2 and the antenna signal lines AL1 and AL2 may transmit, receive, or transmit/receive a radio frequency signal (for example, electromagnetic wave) or an AC voltage signal converted from the radio frequency signal.

The antenna patterns AP1 and AP2 may be disposed in the touch sensing area TSA. Accordingly, even if an electronic device including the touch sensor 200 is miniaturized or thinned or an area of the peripheral area PA is reduced, since an area of the touch sensing area TSA is secured, a space in which an antenna is to be disposed can be easily secured.

The antenna patterns AP1 and AP2 may have a shape similar to that of the first to third dummy electrodes DE1 to DE3. A first antenna pattern AP1 may be disposed in the opening of the first sensor portion SP1 or the opening of the second sensor portion SP2. For example, the first antenna pattern AP1 may have a rhombus shape.

A second antenna pattern AP2 may be disposed in a space between the first sensing electrodes IE1-1 and IE1-2 and the second sensing electrodes IE2-1, IE2-2, and IE2-3. For example, the second antenna pattern AP2 may have an 'X' shape.

The first dummy electrode DE1, the second dummy electrode DE2, the third dummy electrode DE3, the first antenna pattern AP1, and the second antenna pattern AP2 may be disposed on the same layer as the first sensor portion SP1 and the second sensor portion SP2.

A predetermined first antenna pattern AP1 and a predetermined second antenna pattern AP2 may be connected to each other by a third connection portion CP3. The third connection portion CP3 may be disposed on a layer different from the first antenna pattern AP1 and the second antenna pattern AP2. For example, the third connection portion CP3 may be disposed on the same layer as the second connection portion CP2. Accordingly, the antenna patterns AP1 and AP2 and the sensing electrodes IE1-1, IE1-2, IE2-1, IE2-2, and IE2-3 may not be short-circuited to each other.

One end of each of the antenna signal lines AL1 and AL2 may be connected to one end of each of the corresponding antenna patterns AP1 and AP2. The other end of each of the antenna signal lines AL1 and AL2 may be connected to the corresponding antenna pads APDS, respectively.

The antenna signal lines AL1 and AL2 may extend so as not to be short-circuited with the first signal lines SL1-1 and SL1-2 and the second signal lines SL2-1, SL2-2, and SL2-3. For example, the antenna signal lines AL1 and AL2 may overlap at least some of the first signal lines SL1-1 and SL1-2 and the second signal lines SL2-1, SL2-2, and SL2-3, but do not contact each other.

The antenna signal lines AL1 and AL2 may extend to the second peripheral area PA2 through the first peripheral area PA1.

The antenna pads APDS may include antenna signal pads APD1 and APD2 and ground pads AGPD1 and AGPD2. The antenna pads APDS may be disposed in the second peripheral area PA2. The antenna pads APDS may include a conductive material.

A first antenna signal line AL1 may be connected to a first antenna signal pad APD1, and a second antenna signal line AL2 may be connected to a second antenna signal pad APD2. The first and second antenna signal pads APD1 and APD2 may transmit AC signals to the antenna patterns AP1 and AP2 through the antenna signal lines AL1 and AL2.

The ground pads AGPD1 and AGPD2 may be connected to a ground of a device or the like (for example, a ground of the display panel or a system ground) through a predetermined contact hole or the like. Also, at least some of the ground pads AGPD1 and AGPD2 may be electrically connected to at least some of the antenna signal lines AL1 and AL2.

In an embodiment, a touch ground line TGL may be disposed to surround the touch sensing area TSA in the first peripheral area PA1 of the sensor substrate S_SUB. The touch ground line TGL may perform functions such as static electricity protection.

As shown in FIG. 4, when the antenna function and configuration are designed to be integrated into the touch sensor 200, the antenna signal lines AL1 and AL2 and the antenna pads APDS should be added. In this case, in order to arrange the antenna pads APDS, an area of the peripheral area PA (for example, a dead space or a bezel) may have to be increased.

Alternatively, in order to minimize the area of the peripheral area PA, wirings such as signal lines of the touch sensor 200 and the antenna pads APDS may be designed to overlap each other. However, in this case, the thickness of the peripheral area PA of the touch sensor 200 may have to be increased. Antenna performance may be deteriorated due to such an increase in thickness and parasitic capacitance between the antenna pads APDS and other wirings.

In the touch sensor 200 of the display device 1000 according to the embodiments, the antenna pads APDS may be disposed in the second peripheral area PA2 bent with respect to the bending line BL. Accordingly, an increase in the bezel of the display device 1000 and an increase in the thickness of the touch sensor 200 may be minimized.

Figure 5:
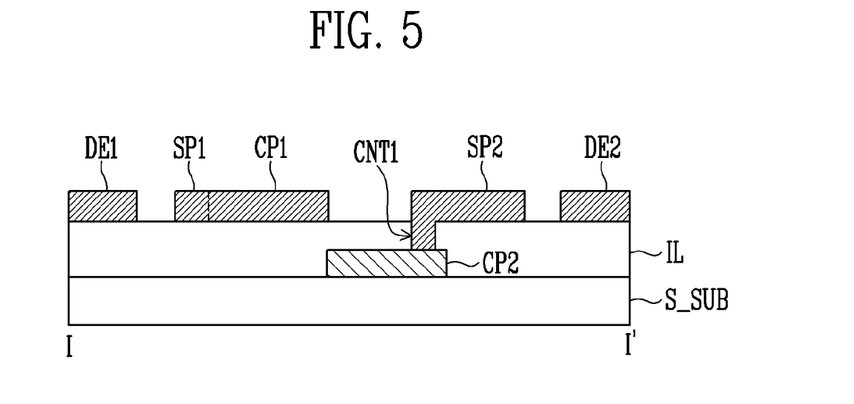
FIG. 5 is a cross-sectional view illustrating an example of the touch sensor of FIG. 4 taken along line I-I'.
Figure 6:
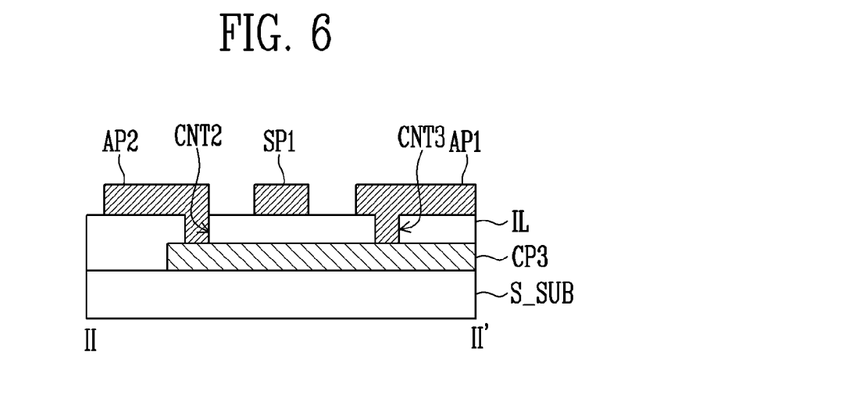
FIG. 6 is a cross-sectional view illustrating an example of the touch sensor of FIG. 4 taken along line II-II'.

FIG. 5 is a cross-sectional view illustrating an example of the touch sensor of FIG. 4 taken along line I-I'. FIG. 6 is a cross-sectional view illustrating an example of the touch sensor of FIG. 4 taken along line II-II'.

Referring to FIGS. 2, 4, 5, and 6, the touch sensor 200 may be formed of conductive patterns disposed on the sensor substrate S_SUB.

The sensor substrate S_SUB may function as a base layer (a base film or a base panel) of the touch sensor 200. The sensor substrate S_SUB may include a transparent and flexible material. The sensor substrate S_SUB may have flexibility because it should be bent based on the bending line BL.

For example, the sensor substrate S_SUB may include at least one inorganic insulating layer of silicon oxide, silicon nitride, and silicon oxynitride.

Alternatively, the sensor substrate S_SUB may include a transparent polymer organic material. For example, the sensor substrate S_SUB may include a photoresist, an acryl-based polymer, a polyimide-based polymer, a polyamide-based polymer, a siloxane-based polymer, novolak resins, alkali-soluble resins, or the like. These materials may be used alone or in combination with each other.

In an embodiment, the sensor substrate S_SUB may be a transparent insulating layer disposed directly on the encapsulation layer of the display panel 100.

In an embodiment, the uppermost layer of the encapsulation layer of the display panel 100 may function as the sensor substrate S_SUB. For example, the second connection portion CP2 and the third connection portion CP3 may be disposed on the uppermost layer of the encapsulation layer.

In an embodiment, the sensor substrate S_SUB may be formed in the form of a panel and may be attached to the display panel 100 by an optically transparent adhesive.

A first conductive layer including the second connection portion CP2 and the third connection portion CP3 may be provided on the sensor substrate S_SUB. In this case, the first sensor portion SP1, the second sensor portion SP2, the dummy electrodes DE1, DE2, and DE3, the first antenna pattern AP1, the second antenna pattern AP2, and the first connection portion CP1 may be formed of a second conductive layer formed on the first conductive layer.

However, this is only an example, and the first conductive layer may include the first sensor portion SP1, the second sensor portion SP2, the dummy electrodes DE1, DE2, and DE3, the first antenna pattern AP1, the second antenna pattern AP2, and the first connection portion CP1, and the second conductive layer may include the second connection portion CP2 and the third connection portion CP3.

In an embodiment, the first conductive layer may include an opaque metal. For example, the first conductive layer may include molybdenum, silver, titanium, copper, aluminum, and alloys thereof. The first conductive layer may have a multi-layered metal layer structure. For example, the first conductive layer may have a three-layer structure of molybdenum (Mo)/aluminum (AD/molybdenum (Mo). However, this is only an example, and the first conductive layer may have a three-layer structure of titanium (Ti)/aluminum (AD/titanium (Ti).

In an embodiment, the first conductive layer may include a transparent conductive material. For example, the transparent conductive material may include a transparent conductive oxide such as indium tin oxide (ITO), indium zinc oxide (IZO), zinc oxide (ZnO), or indium tin zinc oxide (ITZO). In addition, the transparent conductive material may include a conductive polymer such as PEDOT, metal nanowires, graphene, and the like.

The second connection portion CP2 and the third connection portion CP3 may be formed by patterning a conductive material deposited on the sensor substrate S_SUB in various ways, such as dry etching or wet etching.

In an embodiment, the third connection portion CP3 may be provided to overlap the first sensor portion SP1, the second sensor portion SP2, the first antenna pattern AP1, or the second antenna pattern AP2 disposed thereon.

An insulating layer IL may be provided on the sensor substrate S_SUB to cover the first conductive layer including the second connection portion CP2 and the third connection portion CP3. The insulating layer IL may include an organic insulating material or an inorganic insulating material. The insulating layer IL may be patterned to have contact holes CNT1, CNT2, and CNT3.

The second conductive layer may be provided on the insulating layer IL. In an embodiment, the second conductive layer may include the first sensor portion SP1, the second sensor portion SP2, the dummy electrodes DE1, DE2, and DE3, the first antenna pattern AP1, the second antenna pattern AP2, and the first connection portion CP1.

The second sensor portion SP2 may be connected to the second connection portion CP2 through a first contact hole CNT1.

The second antenna pattern AP2 may be connected to the third connection portion CP3 through a second contact hole CNT2, and the first antenna pattern AP1 may be connected to the third connection portion CP3 through a third contact hole CNT3. Accordingly, the first antenna pattern AP1 and the second antenna pattern AP2 corresponding to each other may be electrically connected to each other.

In an embodiment, the second conductive layer may include the transparent conductive material described above. Alternatively, the second conductive layer may include the opaque metal described above.

The first conductive layer and the second conductive layer may have the same material or may include different materials.

As described above, the sensor portions SP1 and SP2 and the antenna patterns AP1 and AP2 may be disposed to be spaced apart from each other on the same layer in the touch sensing area TSA.

Figure 7:
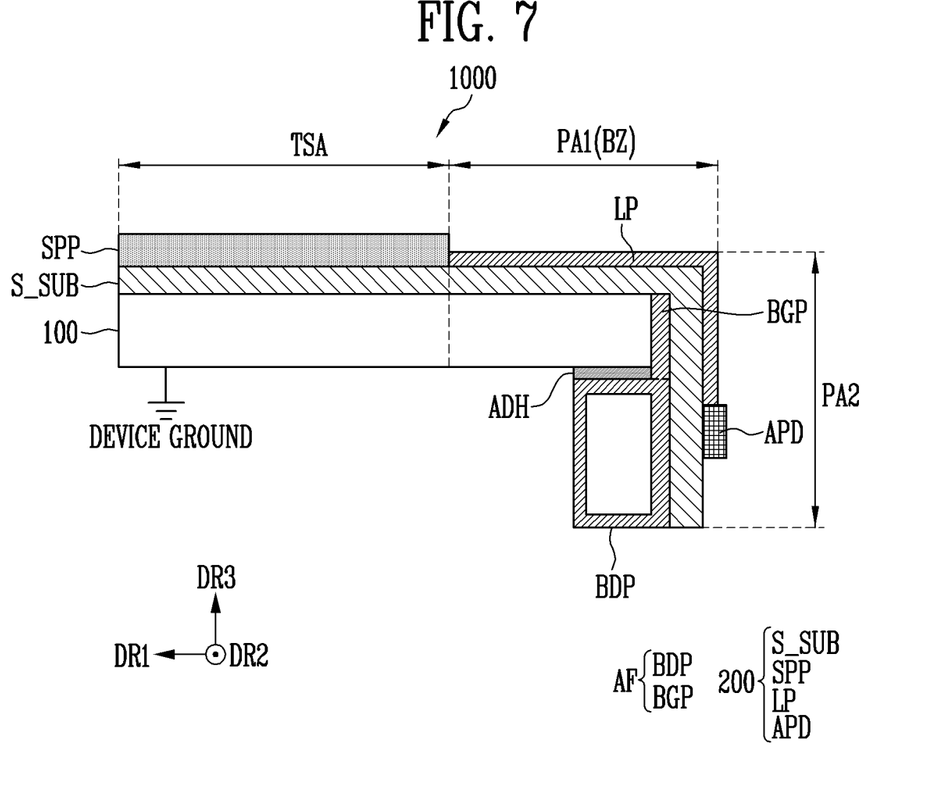
FIG. 7 is a diagram illustrating an example of the display device of FIG. 2.

FIG. 7 is a diagram illustrating an example of the display device of FIG. 2.

Since a display device 1000 of FIG. 7 may be substantially the same as the display device 1000 described with reference to FIGS. 2 to 4, the same reference numerals are used for the same or corresponding components, and duplicate descriptions will be omitted.

Referring to FIGS. 2, 4, and 7, the display device 1000 may include a display panel 100, a touch sensor 200, and an antenna frame AF.

FIG. 7 schematically shows a cross-section of a portion of the display device 1000.

The display panel 100 may include pixels for displaying an image. The display panel 100 may include a device ground or may be connected to an external device ground.

The touch sensor 200 may include a sensor substrate S_SUB, a sensing pattern portion SPP, a wiring portion LP, and an antenna pad APD. The touch sensor 200 (and the sensor substrate S_SUB) may be divided into a touch sensing area TSA, a first peripheral area PA1, and a second peripheral area PA2.

The second peripheral area PA2 of the sensor substrate S_SUB may be bent from the first peripheral area PA1 along the antenna frame AF. For example, the second peripheral area PA2 of the sensor substrate S_SUB may surround an upper surface of the display panel 100 and may be bent in a direction opposite to the third direction DR3 along the shape of the antenna frame AF. In an embodiment, a length of a plane in which the sensor substrate S_SUB is spread in the first direction DR1 may be longer than a length of the display panel 100 in the first direction DR1.

The first peripheral area PA1 may be applied to a bezel BZ in the display device 1000 and an electronic device including the same. The bezel BZ may be minimized only when the length of the first peripheral area PA1 in the first direction DR1 is reduced. Accordingly, the second peripheral area PA2 of the touch sensor 200 may be bent from the first peripheral area PA1 to minimize the bezel BZ.

The sensing pattern portion SPP may be provided in the touch sensing area TSA of the sensor substrate S_SUB. The sensing pattern portion SPP may include the sensing electrodes IE1-1, IE1-2, IE2-1, IE2-2, and IE2-3, the dummy electrodes DE1, DE2, and DE3, and the antenna patterns AP1 and AP2 described with reference to FIGS. 4 to 6.

The wiring portion LP may be disposed in the first peripheral area PA1 and the second peripheral area PA2 of the sensor substrate S_SUB. The wiring portion LP may include signal lines SL1-1, SL1-2, SL2-1, SL2-2, and SL2-3 connected to the sensing electrodes IE1-1, IE1-2, IE2-1, IE2-2, and IE2-3, and antenna signal lines AL1 and AL2 connected to the antenna patterns AP1 and AP2. In an embodiment, the antenna signal lines AL1 and AL2 may extend to the first peripheral area PA1 and the second peripheral area PA2. For example, the antenna signal lines AL1 and AL2 may include bent portions according to a bending shape of the sensor substrate S_SUB.

One end of each of the antenna signal lines AL1 and AL2 may be connected to the antenna pad APD disposed in the second peripheral area PA2. The antenna pad APD may include the ground pads AGPD1 and AGPD2 described with reference to FIG. 4.

The antenna frame AF may be attached to a lower surface of the display panel 100. In an embodiment, a portion of the antenna frame may be attached to the lower surface of the display panel 100 by an adhesive ADH. For example, the adhesive ADH may be a conductive adhesive including a conductive paste.

The antenna frame AF may be provided on one side of the display panel 100 to define the bending shape of the sensor substrate S_SUB.

The antenna frame AF may be connected to a device ground such as a ground of the display panel 100. Accordingly, the antenna frame AF may have a function of a ground plane of a device. Accordingly, there may be an effect that the ground plane of the device extends to the second peripheral area PA2 of the sensor substrate S_SUB.

The antenna frame AF may include a material having a hardness greater than or equal to a predetermined standard. For example, the antenna frame AF may include a conductive material. However, this is only an example, and the antenna frame AF may include a non-conductive material such as a plastic material in consideration of antenna performance, a supporting force capable of supporting the sensor substrate S_SUB, and the like.

In an embodiment, the antenna frame AF may include a body portion BDP and a bending guide portion BGP. In FIG. 7, the corners and ends of the body portion BDP and the bending guide portion BGP are shown to have an angled shape, but the present disclosure is not limited thereto. At least some of the corners may have a curved shape.

The body portion BDP may support the second peripheral area PA2 of the sensor substrate S_SUB. One surface of the body portion BDP may be attached to the lower surface of the display panel 100. In an embodiment, a length of a portion of the body portion BDP attached to the lower surface of the display panel 100 in the second direction DR2 may be substantially the same as a length of the display panel 100 or the sensor substrate S_SUB in the second direction DR2.

In an embodiment, the body portion BDP may have a rectangular frame shape with an empty interior. However, this is only an example, and the shape of the body portion BDP is not limited thereto.

The bending guide portion BGP may extend (protrude) from the body portion BDP to one side of the display panel 100. The bending guide portion BGP may be positioned between the one side of the display panel 100 and the sensor substrate S_SUB. The bending guide portion BGP may be coupled to a predetermined position of the display panel 100 together with an upper surface of the body portion BDP attached to the lower surface of the display panel 100. Also, the bending guide portion BGP and the body portion BDP may support the bent shape of the second peripheral area PA2 of the sensor substrate S_SUB. The sensor substrate S_SUB may be bent along one surface of the bending guide portion BGP and the body portion BDP extending therefrom.

Accordingly, the bending position of the sensor substrate S_SUB may be accurately and uniformly defined, and the stress in the bent portion of the sensor substrate S_SUB may be maintained relatively uniformly. Accordingly, mechanical defects such as cracks due to bending of the sensor substrate S_SUB may be minimized. Furthermore, the curvature of the bent portion of the sensor substrate S_SUB may be controlled according to the shape of the bending guide portion BGP.

In an embodiment, a length of the second peripheral area PA2 defined by the antenna frame AF in the third direction DR3 may be about 3 mm or less. Accordingly, the second peripheral area PA2 of the touch sensor 200 bent in the third direction DR3 may not substantially affect the shape of a module of an electronic device including the display device 1000.

As described above, the display device 1000 may include the touch sensor 200 integrated with an antenna having the second peripheral area PA2 bent along the antenna frame AF. The antenna pad APD may be disposed in the second peripheral area PA2. Accordingly, an area of the bezel BZ of the display device 1000 may be reduced while minimizing mechanical defects due to bending of the touch sensor 200 with integrated antenna function.

In addition, since the antenna frame AF not only supports the shape of the sensor substrate S_SUB, but is also connected to the ground of the device, there may be an effect that the ground plane of the display device 1000 extends to the second peripheral area PA2 of the sensor substrate S_SUB. That is, since the ground plane of the device can cover the area of the sensor substrate S_SUB increased by bending, the performance degradation of the antenna can be minimized (or the antenna performance may be maintained).

FIGS. 8A to 8E are diagrams illustrating examples of an antenna frame included in the display device of FIG. 7.

FIGS. 8A to 8E show examples of vertical cross-sections of antenna frames AF1 to AF5.

Figure 8A:
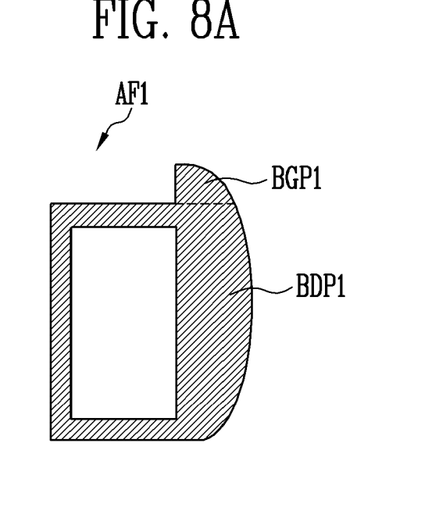
FIGS. 8A to 8E are diagrams illustrating examples of an antenna frame included in the display device of FIG. 7.
Figure 8B:
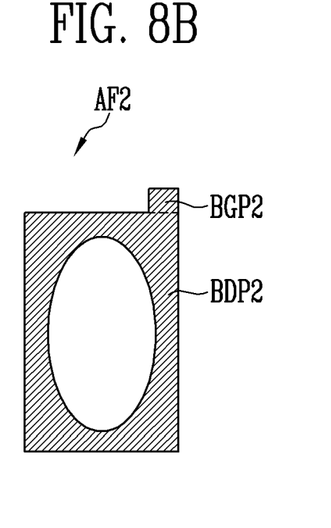
Figure 8C:
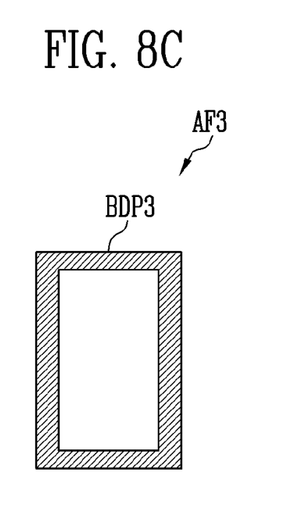
Figure 8D:
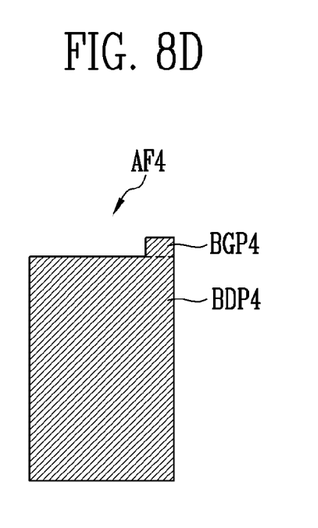

Referring to FIGS. 8A to 8E, the antenna frames AF1 to AF5 may include body portions BDP1, BDP2, BDP3, BDP4, and BDP5. As shown in FIGS. 8A, 8B, and 8D, the antenna frames AF1, AF2, and AF4 may further include bending guide portions BGP1, BGP2, and BGP4.

In an embodiment, as shown in FIG. 8A, surfaces of the sensor substrate S_SUB corresponding to a body portion BDP1 and a bending guide portion BGP1 of an antenna frame AF1 may have a curved shape. A lower surface of the sensor substrate S_SUB in the second peripheral area PA2 may be bent along surface shapes of the body portion BDP1 and the bending guide portion BGP1.

In an embodiment, as shown in FIG. 8B, an inner surface of a body portion BDP2 frame of an antenna frame AF2 may be changed into various shapes other than a rectangular shape. For example, the inner surface of the body portion BDP2 may have an elliptical shape. The inner surface of the body portion BDP2 frame may be designed in a shape for optimizing antenna performance.

Figure 10:
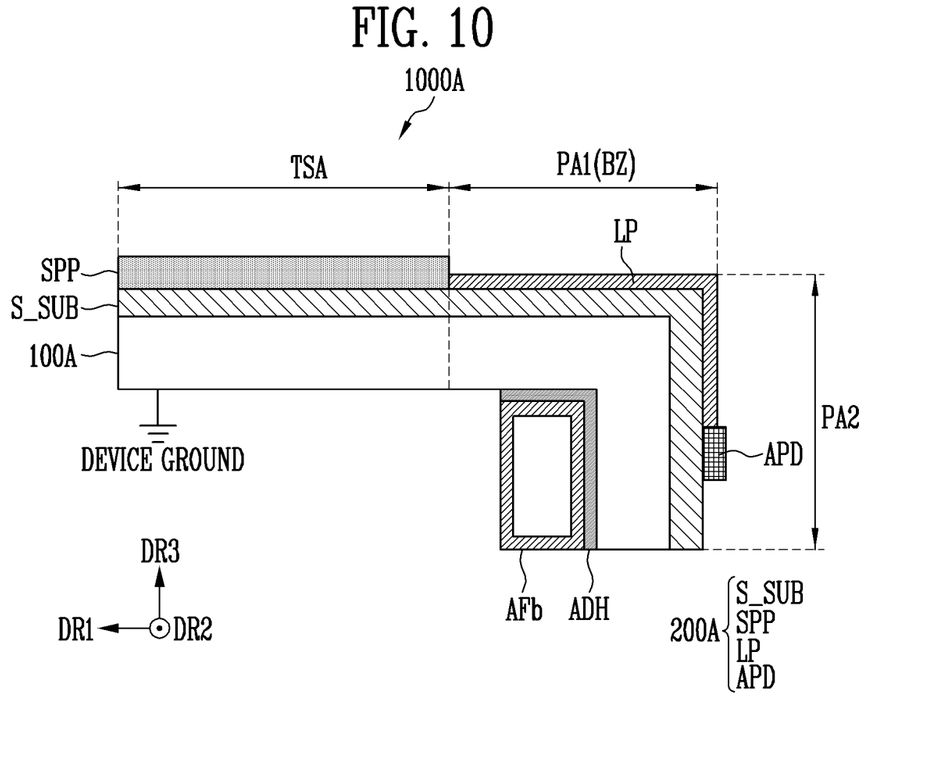
FIG. 10 is a diagram illustrating an example of the display device of FIG. 2.

In an embodiment, as shown in FIG. 8C, an antenna frame AF3 may include only a body portion BDP3 without a bending guide portion. The antenna frame AF3 may be applied to a structure in which even the display panel is bent as shown in FIG. 10.

Figure 8E:
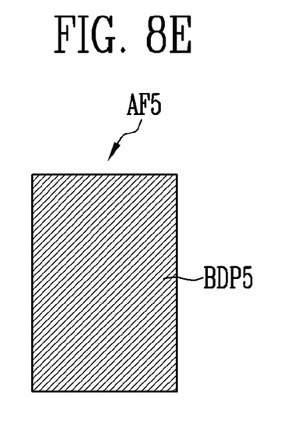

In an embodiment, as shown in FIG. 8D, an antenna frame AF4 may include a body portion BDP4 and a bending guide portion BGP4, and the body portion BDP4 may be filled with a predetermined material. Also, as shown in FIG. 8E, an antenna frame AF5 may include only a body portion BDP5 filled with a predetermined material without a bending guide portion.

Figure 9:
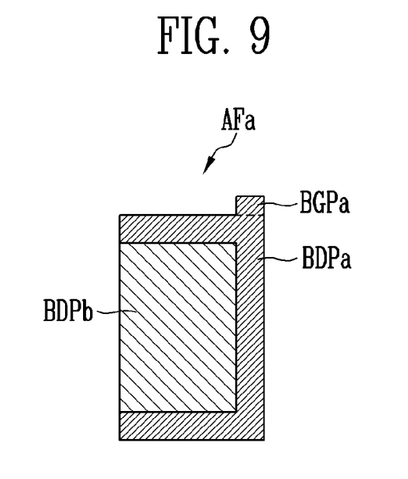
FIG. 9 is a diagram illustrating an example of the antenna frame included in the display device of FIG. 7.

FIG. 9 is a diagram illustrating an example of the antenna frame included in the display device of FIG. 7.

FIG. 9 shows an example of a vertical cross-section of an antenna frame AFa.

Referring to FIG. 9, the antenna frame AFa may include a first body portion BDPa, a second body portion BDPb, and a bending guide portion BGPa.

The first body portion BDPa and the bending guide portion BGPa may include the same material.

At least a portion of the second body portion BDPb may be surrounded by the first body portion BDPa. The first body portion BDPa and the second body portion BDPb may include materials having different dielectric constants, respectively. For example, a dielectric constant of the first body portion BDPa may be greater than a dielectric constant of the second body portion BDPb, or the dielectric constant of the second body portion BDPb may be greater than the dielectric constant of the first body portion BDPa.

For example, the first body portion BDPa may include a metal material, and the second body portion BDPb may include an insulating material.

As described above, the distance between the antenna signal line and the ground plane can be adjusted by forming the antenna frame AFa using materials having different dielectric constants. Accordingly, antenna performance of the touch sensor with integrated antenna function can be further improved.

FIG. 10 is a diagram illustrating an example of the display device of FIG. 2.

A display device 1000A of FIG. 10 may be substantially the same as or similar to the display device 1000 described with reference to FIG. 7 except for a display panel 100A and an antenna frame AFb. Therefore, the same reference numerals are used for the same or corresponding components, and duplicate descriptions will be omitted.

Referring to FIGS. 2 and 10, the display device 1000A may include the display panel 100A, a touch sensor 200A, and the antenna frame AFb.

A plurality of surfaces of the antenna frame AFb may be attached to a portion where the lower surface of the display panel 100A is bent by an adhesive ADH. A length of the antenna frame AFb in the second direction DR2 may be substantially the same as a length of the display panel 100A in the second direction DR2.

In an embodiment, the adhesive ADH may include a conductive adhesive.

The antenna frame AFb may be connected to a ground (or system ground) of the display panel 100A. The antenna frame AFb may function as a ground plane and may serve to guide and support bending of the display panel 100A.

In an embodiment, the display panel 100A may be bent at a predetermined curvature or angle according to the shape to which the antenna frame AFb is attached. The touch sensor 200A may be bent according to the shape of the display panel 100A. For example, the sensor substrate S_SUB and the wiring portion LP including the antenna signal line may be bent according to the shape of the display panel 100A.

The display device 1000A of FIG. 10 may be applied to the display panel 100A made of a bendable material.

Figure 11:
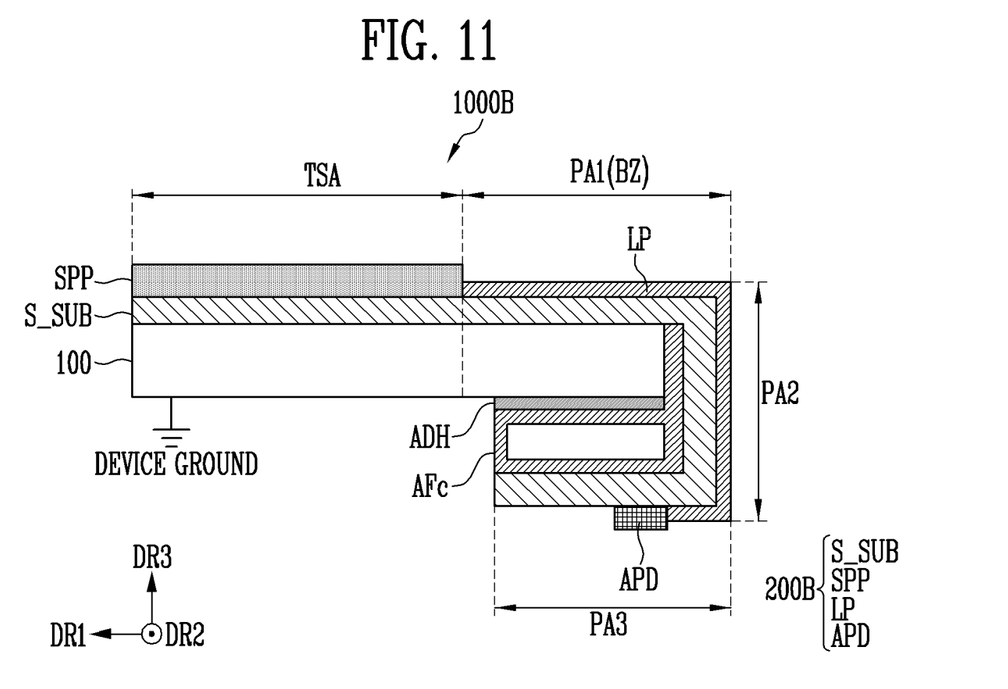
FIG. 11 is a diagram illustrating an example of the display device of FIG. 2.

FIG. 11 is a diagram illustrating an example of the display device of FIG. 2.

A display device 1000B of FIG. 11 may be substantially the same as or similar to the display device 1000 described with reference to FIG. 7 except for the shape of a touch sensor 200B. Therefore, the same reference numerals are used for the same or corresponding components, and duplicate descriptions will be omitted.

Referring to FIGS. 2 and 11, the display device 1000B may include a display panel 100, the touch sensor 200B, and an antenna frame AFc.

The touch sensor 200B (and the sensor substrate S_SUB) may be divided into a touch sensing area TSA, a first peripheral area PA1, a second peripheral area PA2, and a third peripheral area PA3.

In an embodiment, the third peripheral area PA3 may be bent from the second peripheral area PA2 in the first direction DR1. The third peripheral area PA3 may face the first peripheral area PA1 in the third direction DR3.

In an embodiment, the antenna pad APD may be disposed in the third peripheral area PA3 and may overlap the display panel 100 in the third direction DR3. The antenna signal line of the wiring portion LP may extend from the first peripheral area PA1 to the third peripheral area PA3 through the second peripheral area PA2.

The antenna frame AFc may be attached to the lower surface of the display panel 100. In an embodiment, a portion of the antenna frame AFc may be attached to the lower surface of the display panel 100 by an adhesive ADH. The antenna frame AFc may include the body portion and the bending guide portion described above. The antenna frame AFc may support the second peripheral area PA2 and the third peripheral area PA3 of the sensor substrate S_SUB.

As described above, since the touch sensor 200B has a structure that is bent twice, the thickness of the display device 1000B can be further reduced compared to the embodiment of FIG. 7.

Figure 12A:
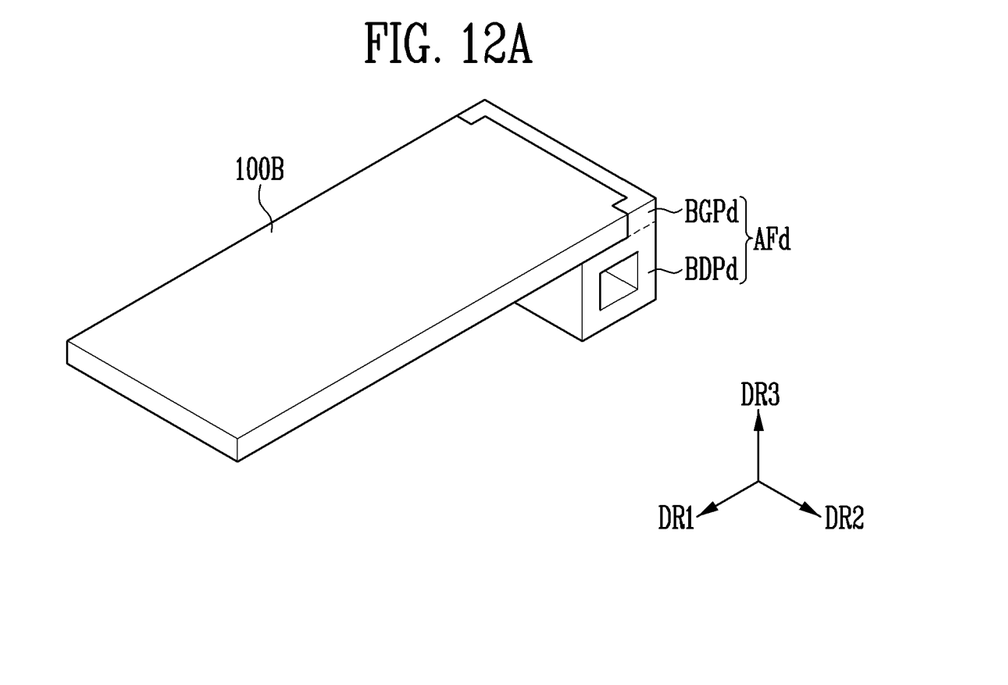
FIG. 12A is a perspective view illustrating an example in which an antenna frame is coupled to a display panel in the display device of FIG. 2.
Figure 12B:
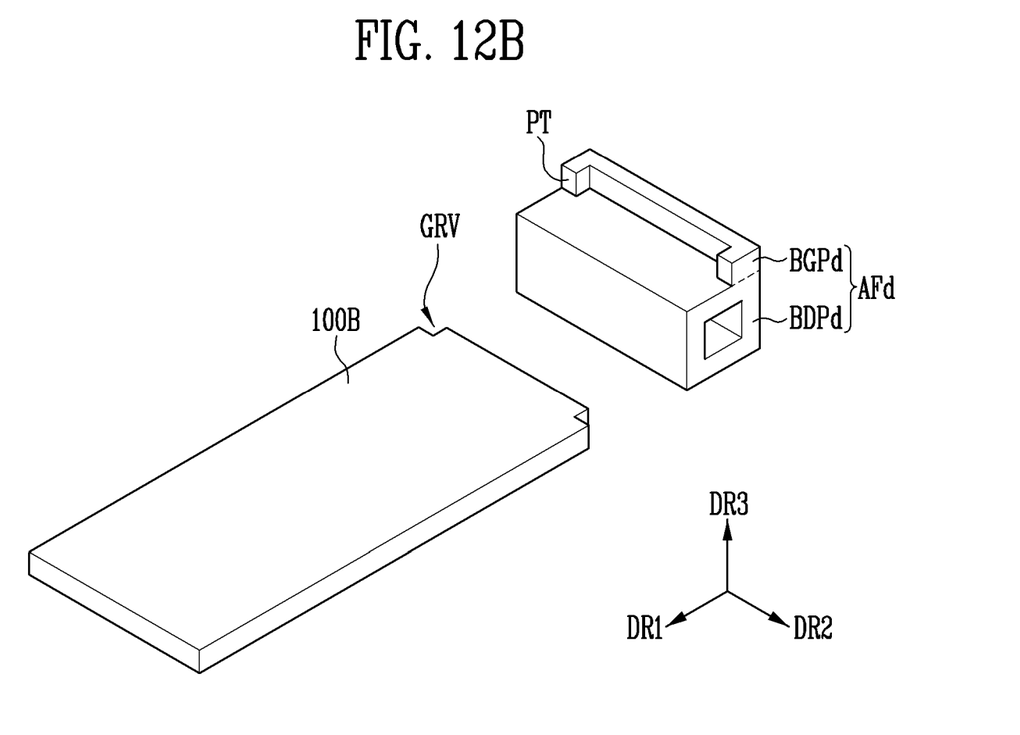
FIG. 12B is an exploded perspective view illustrating an example of the display panel and the antenna frame of FIG. 12A.

FIG. 12A is a perspective view illustrating an example in which an antenna frame is coupled to a display panel in the display device of FIG. 2. FIG. 12B is an exploded perspective view illustrating an example of the display panel and the antenna frame of FIG. 12A.

Referring to FIGS. 12A and 12B, one side and a portion of a lower surface of a display panel 100B may be coupled to an antenna frame AFd.

In an embodiment, one side of the display panel 100B coupled to the antenna frame AFd may include at least one groove GRV. For example, grooves GRV in which corners are cut may be formed in both corners of one side of the display panel 100B, respectively. The grooves GRV are not limited to a specific shape.

The antenna frame AFd may include a body portion BDPd and a bending guide portion BGPd. An upper surface of the body portion BDPd may be attached to a corresponding lower surface of the display panel 100B by an adhesive.

In an embodiment, the bending guide portion BGPd of the antenna frame AFd may include protrusions PT each having a shape to be inserted into the grooves GRV of the display panel 100B. The protrusions PT may be coupled to the grooves GRV, respectively.

Accordingly, in a process of attaching the antenna frame AFd to the display panel 100B, an error in an attachment position and a gap between the antenna frame AFd and the display panel 100B may be minimized or reduced.

As described above, the display device according to the embodiments may include the touch sensor integrated with the antenna having the second peripheral area bent along the shape of the antenna frame. The antenna pad may be disposed in the second peripheral area. Accordingly, since the antenna frame evenly distributes stress while supporting the bending of the touch sensor, mechanical defects due to bending of the touch sensor with integrated antenna function may be minimized, and the area of the bezel of the display device may be reduced or minimized.

In addition, since the antenna frame not only supports the shape of the sensor substrate, but is also connected to the ground of the device, there may be an effect that the ground plane of the display device extends to the second peripheral area of the sensor substrate. That is, since the ground plane of the display device can cover the area of the sensor substrate increased by bending and the portion where the antenna pad is disposed, the performance degradation of the antenna can be minimized (or the performance can be maintained).

However, effects of the present disclosure are not limited to the above-described effects, and may be variously extended without departing from the spirit and scope of the appended claims.

As described above, embodiments of the present invention have been described with reference to the drawings. However, those skilled in the art will appreciate that various modifications and changes can be made to the present invention without departing from the spirit and scope of the appended claims.

What is claimed is:

1. A display device comprising:
a display panel;
a sensor substrate disposed on an upper surface of the display panel and including a touch sensing area, a first peripheral area adjacent to the touch sensing area, and a second peripheral area bent from the first peripheral area;
sensing electrodes and an antenna pattern disposed on the touch sensing area of the sensor substrate;
an antenna signal line connected to the antenna pattern and extending to the first peripheral area and the second peripheral area;
an antenna pad disposed in the second peripheral area and connected to the antenna signal line; and
an antenna frame attached to a lower surface of the display panel and defining a bending shape of the sensor substrate.

2. The display device of claim 1, wherein the antenna frame is connected to a ground of the display panel.

3. The display device of claim 2, wherein the antenna frame comprises:
a body portion supporting the second peripheral area of the sensor substrate; and
a bending guide portion extending from the body portion to a side surface of the display panel and positioned between the side surface of the display panel and the sensor substrate, the bending guide portion defining a bending position of the sensor substrate.

4. The display device of claim 3, wherein the body portion and the bending guide portion include a conductive material.

5. The display device of claim 3, wherein the body portion includes an empty space.

6. The display device of claim 3, wherein the body portion includes a first body portion and a second body portion having different dielectric constants.

7. The display device of claim 6, wherein at least a portion of the second body portion is surrounded by the first body portion.

8. The display device of claim 3, wherein the side surface of the display panel includes a groove, and
wherein the bending guide portion includes a protrusion coupled to the groove.

9. The display device of claim 2, wherein the display panel includes a bending portion corresponding to a shape of the antenna frame.

10. The display device of claim 9, wherein a plurality of surfaces of the antenna frame are attached to the bending portion of the lower surface of the display panel by an adhesive.

11. The display device of claim 10, wherein the adhesive includes a conductive adhesive.

12. The display device of claim 2, wherein the sensing electrodes and the antenna pattern are disposed on the same insulating layer and spaced apart from each other.

13. The display device of claim 12, further comprising:
a dummy electrode disposed on the touch sensing area of the sensor substrate and spaced apart from the sensing electrodes and the antenna pattern.

14. The display device of claim 2, further comprising:
a touch ground line disposed to surround the touch sensing area in the first peripheral area of the sensor substrate.

15. A display device comprising:
a display panel;
a sensor substrate disposed on an upper surface of the display panel and including a touch sensing area, a first peripheral area adjacent to the touch sensing area, a second peripheral area bent from the first peripheral area, and a third peripheral area bent from the second peripheral area;
sensing electrodes and an antenna pattern disposed on the touch sensing area of the sensor substrate;
an antenna signal line connected to the antenna pattern and extending to the first peripheral area, the second peripheral area, and the third peripheral area;
an antenna pad disposed in the third peripheral area and connected to the antenna signal line; and
an antenna frame attached to a lower surface of the display panel and defining a bending shape of the sensor substrate,
wherein the antenna frame is connected to a ground of the display panel or an external ground.

16. The display device of claim 15, wherein the antenna frame comprises:
a body portion supporting the second peripheral area and the third peripheral area of the sensor substrate; and
a bending guide portion extending from the body portion to a side surface of the display panel and positioned between the side surface of the display panel and the sensor substrate, the bending guide portion defining a bending position of the sensor substrate.

17. The display device of claim 16, wherein the third peripheral area faces the first peripheral area.

18. The display device of claim 16, wherein the antenna pad overlaps the display panel in a vertical direction of the display panel.

19. The display device of claim 16, wherein the side surface of the display panel includes a groove, and
wherein the bending guide portion includes a protrusion coupled to the groove.

20. The display device of claim 16, wherein the antenna pad comprises:
an antenna signal pad transmitting an AC signal to the antenna pattern through the antenna signal line; and
a ground pad connected to the ground.

* * * * *